United States Patent [19]

Inoue

[11] Patent Number: 4,737,226

[45] Date of Patent: Apr. 12, 1988

[54] METHOD OF MANUFACTURING AN AUTOMOTIVE SEAT

[75] Inventor: Hirofumi Inoue, Akishima, Japan

[73] Assignee: Tachikawa Spring Co., Ltd., Tokyo, Japan

[21] Appl. No.: 824,968

[22] Filed: Jan. 31, 1986

[30] Foreign Application Priority Data

Jan. 31, 1985 [JP] Japan .................................. 60-17135

[51] Int. Cl.$^4$ ...................... B32B 31/20; B29C 33/40
[52] U.S. Cl. .................................... 156/245; 156/285; 156/306.6; 264/324
[58] Field of Search ............... 156/214, 212, 245, 285, 156/306.6, 309.6, 581, 583.1, 497; 264/320, 324; 100/93 P; 428/317, 317.7, 318.4, 319.3, 319.7; 297/DIG. 1, DIG. 2

[56] References Cited

U.S. PATENT DOCUMENTS

| | | | |
|---|---|---|---|
| 2,957,793 | 10/1960 | Dickey | 156/497 X |
| 3,084,489 | 4/1963 | Seefluth | 156/306.6 X |
| 3,829,343 | 8/1974 | Remmert | 156/306.6 X |
| 4,052,241 | 10/1977 | Walter | 156/245 |
| 4,088,805 | 5/1978 | Wiegand | 156/306.6 X |
| 4,124,421 | 11/1978 | Fujii | 156/581 X |
| 4,247,348 | 1/1981 | Lischer | 156/245 X |
| 4,445,954 | 5/1984 | Adams et al. | 156/245 X |
| 4,596,624 | 6/1986 | Frohlich et al. | 156/497 X |

FOREIGN PATENT DOCUMENTS 1052632  12/1966  United Kingdom ............... 156/245

Primary Examiner—Donald E. Czaja
Assistant Examiner—Ramon R. Hoch
Attorney, Agent, or Firm—Cushman, Darby & Cushman

[57] ABSTRACT

A method of manufacturing an automotive seat is disclosed which comprises the step of placing a trim cover assembly over a cushion member of foam material. In the method, a thermally weldable adhesive cloth is interposed between the trim cover assembly and the cushion member and is then welded by means of heating/pressure operation so that the trim cover assembly can be adhesively attached to the surface of the cushion member. Thus, the method provides such a seat that is improved in finishing as well as durability.

4 Claims, 1 Drawing Sheet

METHOD OF MANUFACTURING AN AUTOMOTIVE SEAT

BACKGROUND OF THE INVENTION

1. Field of the Invention

The present invention relates to a method of manufacturing an automotive seat and, in particular, to a method of manufacturing a so-called unit-type seat which includes a trim cover assembly and a cushion member formed as a unit.

2. Description of the Prior Art

Conventionally, to manufacture a unit-type seat including a trim cover assembly integrally attached to the surface of a cushion member as an automotive seat, there has been employed a method in which the cushion member is formed in a given configuration, a sticky adhesive is applied to the surface of the cushion member, and then the trim cover assembly is pressed against and attached to the cushion member to unite the trim cover assembly and the cushion member in one.

However, when such manufacturing method is employed, since a forming apparatus of a large size and a complicated structure is required, the cost of equipment is high. Also, because the adhesive itself is expensive, the entire seat is high in costs. The adhesive cannot be applied to the cushion member in an even manner and thus unattached portions may exists between the trim cover assembly and the cushion member so that wrinkles or raised portions may be produced easily in the trim cover assembly, which has an adverse effect on the appearance and sitting comfort of the seat.

SUMMARY OF THE INVENTION

The present invention aims at eliminating the drawbacks found in the above-mentioned prior art method.

Accordingly, it is a primary object of the invention to provide a method of manufacturing a unit-type seat having a united trim cover assembly and cushion member which permits a simple and sure connection of a trim cover assembly with a cushion member and also which can reduce the cost of the unit-type seat.

In order to accomplish the above object, in the present invention, there is employed a pressure-mold apparatus which comprises a heating upper mold having a pressure surface identical with the surface of the seat, incorporating a heating element therein and pressure operated by a press cylinder device, and a lower mold on which the cushion member is placed. According to the present method, to obtain a seat including a united trim cover assembly and cushion member, the cushion member is placed on the lower mold, a heat sensitive adhesive cloth formed of thermoplastic resin fibers is put over the surface side of the cushion member, a trim cover assembly cut in a given configuration and having a gore portion sewn to the peripheral edges thereof is heated and pressed down against the heat sensitive adhesive cloth by the heating upper mold to heat and weld the heat sensitive adhesive cloth, and, thanks to the adhesive force of the heat sensitive adhesive cloth, the trim cover assembly is pressure attached to the whole surface of the cushion member in a predetermined form.

The above and other objects, features and advantages of the invention will be more apparent to one skilled in the art from the following detailed description when the same is read in connection with the accompanying drawings in which like reference numerals designate the same or corresponding parts throughout the views.

DETAILED DESCRIPTION OF A PREFERRED EMBODIMENT OF THE INVENTION

Figure 1A:
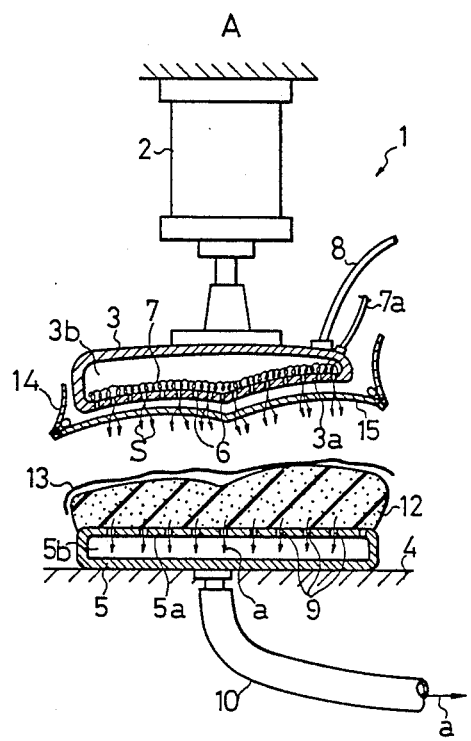
FIGS. 1A and 1B are respectively side section views of a pressure-mold apparatus, illustrating the steps of manufacturing a seat in accordance with the present invention; and, FIG. 2 is a partially cutaway perspective view of a seat manufactured in accordance with the invention.

FIG. 1 illustrates side section views of a pressure-mold apparatus employed in the invention, illustrating its process to form a so-called unit-type seat. The apparatus (1) comprises an upper mold (3) for heating which is connected with a press cylinder device (2), can be moved in a vertical direction and can be pressed by the press cylinder device (2) and a lower mold (5) which is fixed to a base (4). The heating upper mold (3) is formed hollow and has a lower surface or a pressure surface (3a) which is unevenly formed so as to correspond to the surface of the seat to be manufactured and is also formed with a large number of ventilating holes (6). Within the hollow portion (3b) of the upper mold (3) there is provided an electrical heating wire (7) such that it extends along the internal surface of the pressure surface (3a), with a lead wire (7a) thereof being introduced externally. Also, an air feed pipe (8) is introduced into the hollow portion (3b) from outside.

The above-mentioned lower mold (5) is also formed in a hollow configuration and has an upper surface (5a) which is substantially flat and is formed with a large number of ventilation holes (9). A suction pipe (10) is introduced from the hollow portion (5b) of the lower mold (5) externally.

Now, we will describe the process of manufacturing the seat (11) employing the pressure-mold apparatus which is constructed in the above-mentioned manner.

First, as shown in FIG. 1A, a cushion member (12), which is formed of foam material such as urethane or the like in a predetermined configuration, is put on the upper surface (5a) of the lower mold (5), and then a thermally weldable adhesive cloth (13), which is formed of thermoplastic resin fibers such as polyethylene or the like, is placed on the surface side of the cushion member (12). Then, air (a) is sucked from the hollow portion (5a) of the lower mold (5) through the suction pipe (10) and the air (a) is further sucked through the ventilating holes (9) in the upper surface (5a) of the lower mold, so that the cushion member (12) can be brought into close contact with the upper surface (5a) of the lower mold (5) and held in a fixed condition as well as the adhesive cloth (13) can be secured to the surface side of the cushion member (12).

On the other hand, a trim cover assembly (15) having a gore portion (14) sewn to the peripheral edges thereof is set on the pressure surface (3a) of the heating upper mold (3) in such a manner that the internal surface of the trim cover assembly corresponds to the cushion member (12) on the lower mold (5).

Figure 1B:
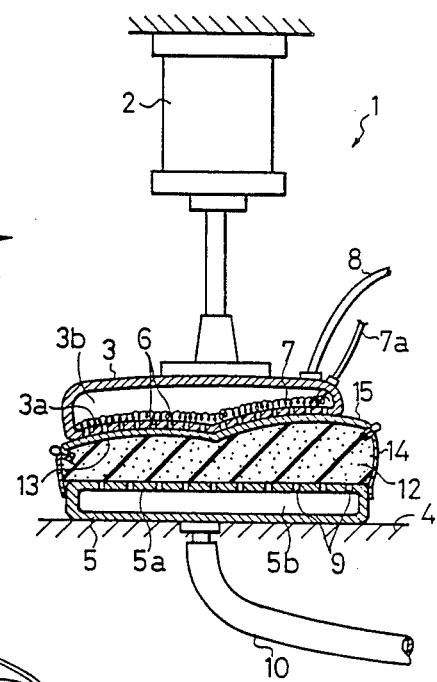

In this condition, the electrical heating wire (7) of the heating upper mold (3) is energized through the lead wire (7a) thereof to heat the pressure surface (3a) of the upper mold (3) up to about 150° C. The heating upper mold (3), as shown in FIG. 1B, is pressed and operated by the press cylinder device (2) to press the trim cover assembly (15) against the surface of the cushion member (12) through the adhesive cloth (13). If the pressure by the heating upper mold (3) is kept for about 20 seconds, then the adhesive cloth (13) is heated and welded so that the trim cover assembly (15) can be pressure attached to the cushion member (12).

Figure 2:
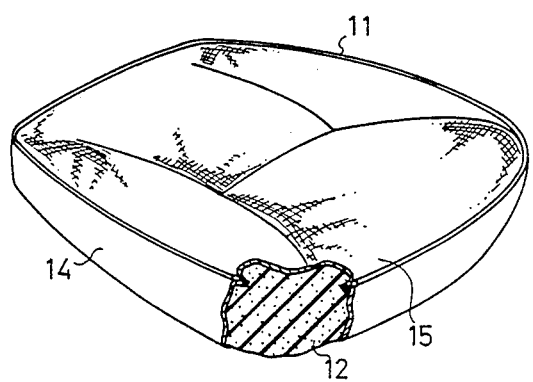

After such pressure attachment, that is, after the lapse of the time of about 20 seconds as mentioned above, the upper mold (3) is moved upward to return its original position, which completes the pressure attaching operation of the trim cover assembly (15) relative to the cushion member (12). When the pressure attaching operation is completed, all portions of the cushion member (12) and the trim cover assembly (15) that correspond to the adhesive cloth (13) are adhesively attached together to form an integral unit so that the seat (11) shown in FIG. 2 is produced.

Also, in the above-mentioned pressure attaching operation, when, during the downwardly pressing operation of the heating upper mold (3), steam s is fed into the hollow portion (3b) thereof via the feed pipe (8) and is then jetted out through the ventilating holes (6) in the pressure surface (3a) thereof, then the steam s is penetrated through the trim cover assembly (15) into the adhesive cloth (13) to promote the welding of the adhesive cloth (13), which enhances further the adhesion effects of the adhesive cloth (13) on the cushion member (12) and the trim cover assembly (15) and also which prevents the trim cover assembly (15) from changing in quality due to heating.

In the pressure-mold apparatus (1), the shape of the pressure surface (3a) of the heating upper mold (3) is not always limited to that shown in the drawings, it may be altered according to the surface configuration of the seat (11) to be manufactured.

Also, in the present invention, since ordinarily used mechanism can be applied as a setting/holding mechanism to set and hold the trim cover assembly (15) relative to the heating upper mold (3) and as a holding mechanism to hold the cushion member (12) relative to the lower mold (5), the description and illustration thereof are omitted in this specification.

As described hereinbefore, according to the invention, the thermally weldable adhesive cloth is inserted between the trim cover assembly and the cushion member and it is welded by means of the heating and pressure attaching operation to adhesively attach the trim cover assembly to the cushion member so as to produce the seat as a unit. For this reason, the trim cover assembly and the cushion member can be attached evenly all over in the respective portions thereof between which the adhesive cloth is interposed and thus they are surely united in one, resulting in the improved finishing and durability of the products. The invention also eliminates the step of applying adhesives in the manufacturing process to simplify the manufacturing process. Further, since the pressure-attaching/forming apparatus of the invention may be equipped with the heating/pressure mold only, it may be smaller in size and is simple to construct, which can reduce the cost of equipment. In addition, the adhesive cloth employed in the invention as the adhesive is inexpensive. Thus, the cost of the entire seat can be reduced. That is, the present invention provides several important and practical effects.

The description above has been given of a preferred embodiment of the invention, but it should be understood that the invention is not limited to the embodiment illustrated but various other replacements, modifications and additions may structurally be possible without departing from the scope and spirit of the appending claims for the invention.

What is claimed is:

1. A method of manufacturing an automotive seat using a pressure mold apparatus which includes a hollow upper mold having a heating means extending along an interior surface thereof, a pressure surface corresponding to the surface configuration of the seat to be formed, and a plurality of holes defined in said pressure surface and a hollow lower mold having a flat upper surface and a plurality of holes defined in said upper surface, comprising the steps of:

placing a cushion member having an upper surface corresponding to the surface configuration of the seat to be formed on said lower mold;

placing a thermally weldable adhesive cloth of thermoplastic resin fibers on said upper surface of said cushion member;

sucking air through said plurality of holes of said lower mold so as to bring said cushion member into close contact with an upper surface of said lower mold and to secure said adhesive cloth to said upper surface of said cushion member;

placing a trim cover assembly between said upper mold and said adhesive cloth, adjacent to said pressure surface of said upper mold;

applying heat through said pressure surface of said upper mold to said trim cover assembly;

lowering and pressing said upper mold against said trim cover assembly, said adhesive cloth, and said cushion member, while applying heat with said heating means; and during said pressing and heating steps, applying steam through said plurality of holes of said upper mold while sucking air through said plurality of holes of said lower mold such that the steam penetrates through said trim cover assembly into said adhesive cloth, thereby promoting the weldability of said adhesive cloth and preventing said trim cover assembly from changing in quality due to said heating, whereby, said adhesive cloth is increased in weldability and welded so as to adhesively attach said trim cover assembly to said cushion member without excessive heat deterioration of said trim cover assembly.

2. The method as set forth in claim 1, wherein said heating means comprises an electrical heating wire and a feed means is coupled to said upper mold for feeding said steam into the hollow interior of said upper mold.

3. The method as set forth in claim 2, wherein said feed means comprises a feed pipe.

4. The method as set forth in claim 1, further comprising a suction pipe means operatively coupled to the hollow interior of said lower mold for applying suction thereto.

* * * * *